United States Patent [19]

Matos et al.

[11] Patent Number: 5,791,441
[45] Date of Patent: Aug. 11, 1998

[54] BRAKE FAILURE MONITORING SYSTEM

[76] Inventors: Anthony Matos, 524 Chillingham Crt, Oakville, Ontario, Canada, L6J 6N7; Arthur S. Cornford, 965 Inverhouse Drive, Mississauga, Ontario, Canada, L5J 4B4; Edward A. Matos, 523 Valley Drive, Oakville, Ontario, Canada, L6L 4L9

[21] Appl. No.: 756,011
[22] Filed: Nov. 25, 1996
[51] Int. Cl.⁶ .................................................. F16D 66/00
[52] U.S. Cl. ........................ 188/1.11 L; 188/79.55; 340/454; 200/61.44; 200/61.76
[58] Field of Search .................... 188/1.11 L, 1.11 E, 188/79.55; 73/121, 129; 116/208; 340/453, 454; 200/61.44, 61.76; 192/30 W

[56] References Cited

U.S. PATENT DOCUMENTS

| | | | |
|---|---|---|---|
| 3,646,512 | 2/1972 | Bovgstede | 200/61.44 |
| 4,440,279 | 4/1984 | Schreiner | 188/1.11 L |
| 4,642,603 | 2/1987 | Martinez | 188/1.11 L |
| 4,674,326 | 6/1987 | Reinecke | 188/1.11 L |
| 4,708,225 | 11/1987 | Feldwar et al. | 188/1.11 E |
| 4,757,300 | 7/1988 | Setalos | 340/454 |
| 4,800,991 | 1/1989 | Miller | 340/454 |
| 5,139,115 | 8/1992 | Bionne et al. | 188/1.11 E |
| 5,285,190 | 2/1994 | Humphreys et al. | 340/454 |
| 5,310,023 | 5/1994 | Martinez | 188/1.11 L |
| 5,358,075 | 10/1994 | Jarzowbek | 188/1.11 L |
| 5,433,296 | 7/1995 | Webberley | 188/1.11 |
| 5,572,187 | 11/1996 | Williford | 340/454 |

*Primary Examiner*—Chris Schwartz
*Attorney, Agent, or Firm*—Donald E. Hewson

[57] ABSTRACT

A truck brake monitoring system comprises a signal producing sensor mechanism for each brake, each sensor mechanism having a main body member mounted on a respective brake, and with an actuation member of each sensor mechanism positioned with respect to the respective brake actuating mechanism so as to be actuatable by the respective brake actuating mechanism, when the respective brake is operated, for reversible operation between a rest configuration to a sensing configuration whereat a threshold signal is produced, such that when the brake actuating mechanism reaches a threshold limit of travel corresponding to one of malfunction of the braking system and a threshold brake pad thickness below which thickness the brake pad is considered unsafe, the sensing configuration of the signal producing sensor mechanism is realized, and the threshold signal is produced. Respective indicators in the truck's cab receive the threshold signal and provide an alarm indication, so as to identify the brake from which the threshold signal was produced. A normally closed limit switch comprises a main body member, first and second terminals, a contact member movable with respect to the first terminal between extended and retracted positions, a conductive bridging member, an actuator stem, a plunger member, and an insulator disposed between the plunger member and the contact member. A normally open limit switch comprises a main body member, first and second terminals, a manually operable actuator stem, a plunger member, a contact member movable with respect to the first terminal between extended and retracted positions.

14 Claims, 7 Drawing Sheets

BRAKE FAILURE MONITORING SYSTEM

FIELD OF THE INVENTION

This invention relates to vehicle braking systems on transport trucks and the like, and more particularly to a brake monitoring system for use on a braking system of a truck, especially to a fail-safe brake monitoring system. This invention also relates to a limit switch used as part of such fail-safe brake monitoring systems.

BACKGROUND OF THE INVENTION

Large trucks, such as transport trucks and the like, are commonly used throughout the world to haul large loads of various types of goods. Such large trucks are extremely heavy and accordingly typically have perhaps eighteen to thirty wheels, including all of the wheels on the cab and all of the wheels on the trailer. Such large trucks, especially if fully loaded, require an extreme amount of braking force in order to slow down or stop. Accordingly, it is necessary to outfit each wheel on a transport truck, including both the cab and the trailer, with its own brake, typically an air actuated drum brake.

Even with a brake mounted on each wheel, the braking system of a large truck is very often pushed to its limit, and even past its limit, to stop the truck, especially when the truck is travelling down an incline. It is therefore extremely important that each of the brakes on the truck is in good mechanical working order in order so as to provide proper braking to the respective wheel.

Additionally, as is commonly known, very often brakes on large trucks are not in good mechanical working order, and therefore are not safe. Indeed, it is commonly believed that the brakes on most large trucks would not pass a government safety inspection, as at least one brake would not be in proper working order or would be substandard in some way, in terms of brake pad thickness, or similar. Evidence of this is the recent number of accidents involving transport trucks unable to stop in time.

There are two main reasons for truck brakes being in poor mechanical operating condition or being sub-standard. Firstly, inspecting truck brakes is difficult and time consuming as it requires physically crawling beneath the truck and inspecting each wheel separately. Accordingly, many owners and/or operators just do not make this manual check of a truck's brakes, at least not as frequently as should be done. Secondly, there is a significant cost involved in the repair of tractor trailer brakes. Typically, individual owners and/or operators of a large truck will defer such repairs, and therefore the associated costs, as long as possible, for cash flow reasons. For companies owning and operating a large fleet of trucks, the total cost for maintaining truck brakes in proper mechanical working condition at all times would be quite expensive on an overall basis.

Another consideration is that of periodic inspections by a licensed government inspector, as is necessary by law in most jurisdictions. When truck brakes are inspected by a government inspector, the inspector must perform a manual check of the brakes, which again is inconvenient and time consuming. Further, reliance is made on the skill and integrity of the government inspector to ensure that the inspection is performed properly, correctly recorded, and subsequently reported fully and accurately.

It is an object of the present invention to provide a safety system for use on large trucks, which safety system alerts a driver when at least one brake on a transport truck is in sub-standard condition.

It is an object of the present invention to provide a safety system for use on large trucks, which safety system alerts a driver when at least one brake on a transport truck is near sub-standard condition.

It is an object of the present invention to provide a safety system for use on large trucks, which safety system identifies which brake is in or near sub-standard condition.

It is an object of the present invention to provide a safety system for use on large trucks, which safety system alerts other drivers when at least one brake on a transport truck is in or near sub-standard condition.

It is an object of the present invention to provide a safety system for use on large trucks, wherein it is easy and convenient to discern whether at least one brake on a transport truck is in or near sub-standard condition.

It is an object of the present invention to provide a safety system for use on large trucks, which safety system functions automatically when the brakes are applied.

It is an object of the present invention to provide a safety system for use on large trucks, which safety system discerns very quickly on demand whether at least one brake on a transport truck is in or near sub-standard condition.

It is an object of the present invention to provide a safety system for use on large trucks, which safety system produces recorded results.

It is an object of the present invention to provide a safety system for use on large trucks, wherein recorded results produced by the safety system are usable to verify the condition of a truck's brakes to the appropriate authorities.

It is an object of the present invention to provide a safety system for use on large trucks, which safety system is usable by inspectors to discern whether at least one brake on a transport truck is in or near sub-standard condition.

It is an object of the present invention to provide a safety system for use on large trucks, which safety system provides an alert in the event of a fault within the safety system.

SUMMARY OF THE INVENTION

In accordance with one aspect of the present invention, there is provided a brake monitoring system for use on a braking system of a truck, wherein the braking system includes a plurality of separate brakes, and wherein each brake includes a brake actuating mechanism for urging the brakes from a brake-off position to a brake-on position in order to apply the brakes of the truck, and wherein the brake-on position will vary with brake wear, and wherein the brake-on position is subject to malfunction of the braking system. The brake monitoring system comprises a signal producing sensor mechanism for each brake, each sensor mechanism having a main body member and an actuation member mounted within the main body member for reversible operation between a rest configuration and a sensing configuration at which a threshold signal is produced. Each sensor mechanism is securely mounted on a respective brake, and the actuation member of each sensor mechanism is positioned with respect to the respective brake actuating mechanism so as to be actuatable from its rest configuration to its sensing configuration by the respective brake actuating mechanism, when the respective brake is operated from its brake-off position to its brake-on position such that when the brake actuating mechanism reaches a threshold limit of travel corresponding to one of malfunction of the braking system threshold and a brake pad thickness below which thickness the brake pad is considered unsafe, the sensing configuration of the signal producing sensor mechanism is realized, and the threshold signal is produced. Respective indicator means are disposed in the truck's cab and operatively connected to each of the sensor mechanisms so as to permit receipt by the indicator means of the threshold signal from each of the sensor mechanisms. Upon receipt of a threshold signal from any of the sensor mechanisms, the indicator means provides an alarm indication, so as to identify the brake from which the threshold signal was produced.

In accordance with another aspect of the present invention, there is provided a normally closed single pole single throw electrical limit switch comprising an electrically conductive generally cylindrical main body member having a first end, a second end and a first longitudinal axis extending between the first and second ends. A first terminal is mounted in electrically isolated relation with respect to the main body member. A contact member is connected in electrically conductive relation to the first terminal and is connected in selectively displaceable relation to the first terminal for reversible movement, against a contact biasing spring, from an extended position to a retracted position. A conductive bridge member is disposed in electrically conductive contact with the contact member when the contact member is in the extended position and disposed in non-contacting electrically insulated relation with the contact member when the contact member is removed from the extended position. A second terminal is connected in electrically conductive relation with respect to the main body member. A manually operable actuator stem is mounted in the main body member for slidable movement with respect thereto and is connected in electrically conductive relation to the second terminal. An electrically conductive plunger member is connected in electrically conductive relation to the manually operable actuator stem and in electrically conductive contact with the conductive bridge member, and further is slidably mounted in the main body member for slidable movement with the manually operable actuator stem. An insulator is disposed between the electrically conductive plunger member and the contact member for precluding direct electrically conductive contact of the electrically conductive plunger member and the contact member with each other. The electrically conductive plunger member is movable by manual actuation of the actuator stem, against an actuator biasing spring, from a rest position at which the plunger member is disposed in spaced relation from the contact member and the contact member is in the extended position; through an initial contact position at which the insulator is in contact with the contact member and the plunger member, and the contact member is in the extended position, so as to permit the plunger member to move the contact member from the extended position toward the retracted position; through an initial open position at which the contact member is slightly removed from the extended position and is removed from electrical contact with the conductive bridge member, thus electrically opening the electrical switch; and to a full-throw position at which the contact member is moved to the retracted position and the plunger member remains removed from electrical contact with the conductive bridge member, thus retaining the electrical switch electrically open.

In accordance with yet another aspect of the present invention, there is provided a normally open single pole single throw electrical limit switch comprising an electrically conductive generally cylindrical main body member having a first end, a second end and a first longitudinal axis extending between the first and second ends. A first terminal is mounted in electrically isolated relation with respect to the main body member. A second terminal is connected in electrically conductive relation with respect to the main body member. A manually operable actuator stem is mounted in the main body member for slidable movement with respect thereto and is connected in electrically conductive relation to the second terminal. An electrically conductive plunger member is connected in electrically conductive relation to the manually operable actuator stem, and further is slidably mounted in the main body member for slidable movement with the manually operable actuator stem. A contact member is connected in electrically conductive relation to the electrically conductive plunger member and is connected in selectively displaceable relation to the electrically conductive plunger member for reversible movement, against a contact biasing spring, from an extended position to a retracted position. The electrically conductive plunger member is movable by manual actuation of the actuator stem, against an actuator biasing spring, from a rest position at which the contact member is disposed in spaced relation from the first terminal and the contact member is in the extended position; through an initial contact position at which the contact member is in electrically conductive contact with the first terminal and the contact member is in the extended position, thus electrically closing the electrical switch; and to a full-throw position at which the contact member is moved to the retracted position and the contact member remains in electrically conductive contact with the first terminal, thus retaining the electrical switch electrically closed.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which:

FIG. 7C is an enlarged side sectional view of the limit switch according to FIG. 6A, with the actuator stem in a full-throw position and the limit switch in an electrically closed configuration.

DETAILED DESCRIPTION OF THE PREFERRED EMBODIMENTS

Figure 1:
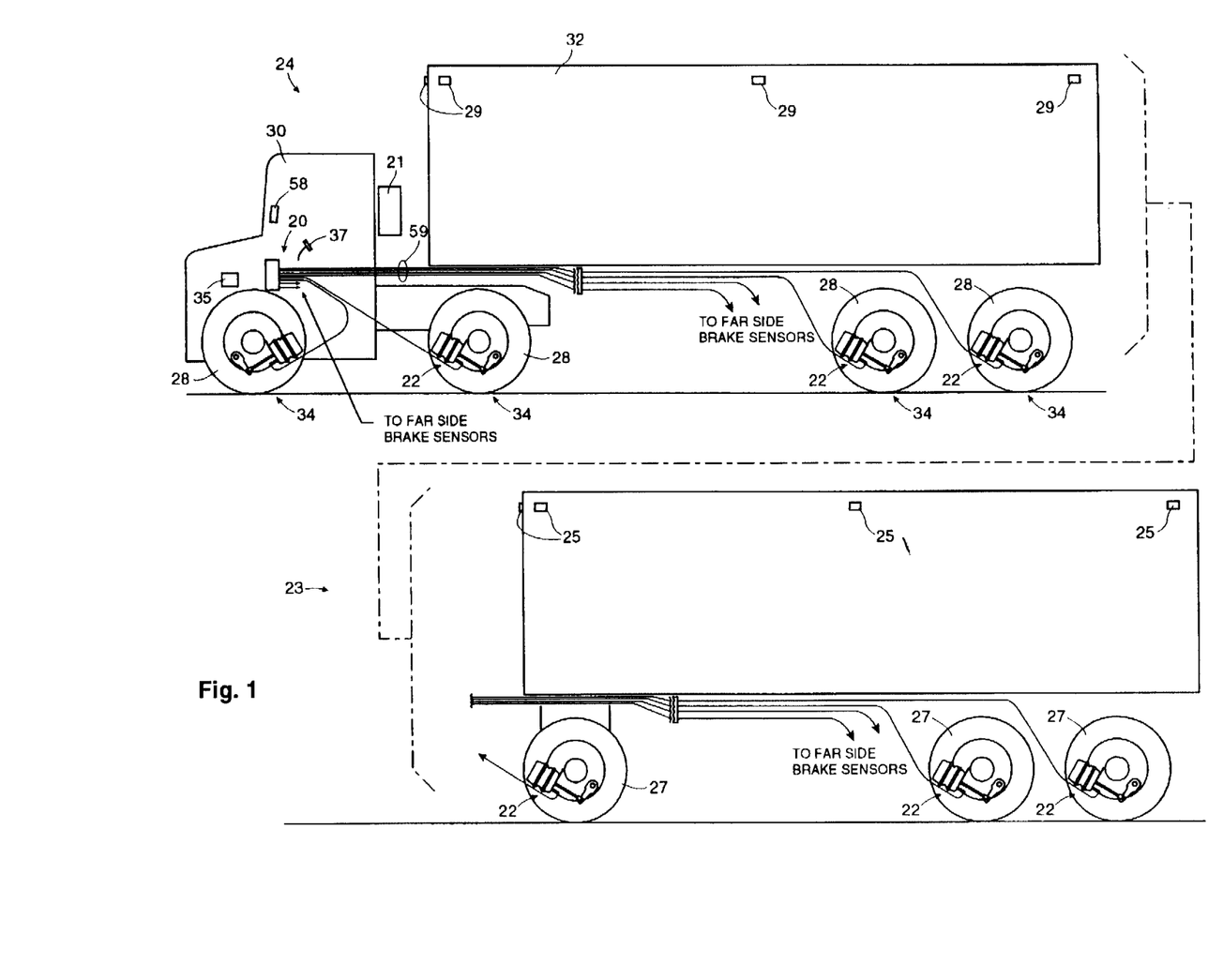
FIG. 1 is a diagrammatic view of the brake monitoring system of the present invention installed on a conventional transport truck.

Reference will now be made to FIGS. 1 through 7C, which show the preferred embodiment of the brake monitoring system of the present invention, as indicated by the general reference numeral 20. The braking system 22, is shown on a conventional transport truck 24, as best seen in FIG. 1, comprising a tractor 30 having a cab 31 and wheels 28, a trailer 32 having wheels 28 and marker lights 29, and also an auxiliary trailer 23 having wheels 27 and marker lights 25. The marker lights 29 are releasably connectable by means of a connector plug 131 (see FIG. 5) to a co-operating power source receptacle 132 on the tractor 30. The power source outlet is controlled by a power switch 33 disposed between the power source outlet and the power source 35 on the tractor 30. The marker lights 25 on the auxiliary trailer 23 are similarly connectable to the trailer 32.

The transport truck 24 also includes a plurality of separate brakes 26 (see FIG. 2), one for each wheel 28 of the tractor 30, and the trailer 32; and also one for each wheel 27 on the auxiliary trailer 23, if attached. Each brake includes a brake actuating mechanism, as indicated by the general reference numeral 34, for urging the brakes 26 from a brake-off position, to a brake-on position, in order to apply the brakes 26 of the transport truck 24.

A braking system on a conventional transport truck 24 is actuated by means of a compressed air source 21 providing an elevated air pressure level in the braking system 22 upon actuation of a brake pedal 37 in the cab 31 of the tractor 30. Insufficient air pressure provided to the braking system will preclude the brakes from being fully operational, or even operational at all. Optionally, the brake monitoring system 20 of the present invention further comprises a pressure sensor mechanism, preferably in the form of a pressure sensor switch 39, operatively mounted on the braking system—more specifically on an air cylinder 70 of one of the brake actuation mechanisms 34, as can be best seen in FIG. 2, so as to sense the air pressure level within the braking system. The pressure sensor switch 39 is actuatable by the air pressure level in the braking system such that when the air pressure level drops below a threshold level a threshold pressure signal is produced. An air pressure indicator means 57 in the form of an indicator lamp of one type or another, preferably a light emitting diode, is disposed on a display panel 58 in the truck's cab 31, and is operatively connected to the pressure sensor switch 56 so as to permit receipt of the pressure signal from the pressure sensor switch 56 by the air pressure indicator means, so as to indicate that the air pressure in the braking system 22 has dropped below the threshold level.

Figure 2:
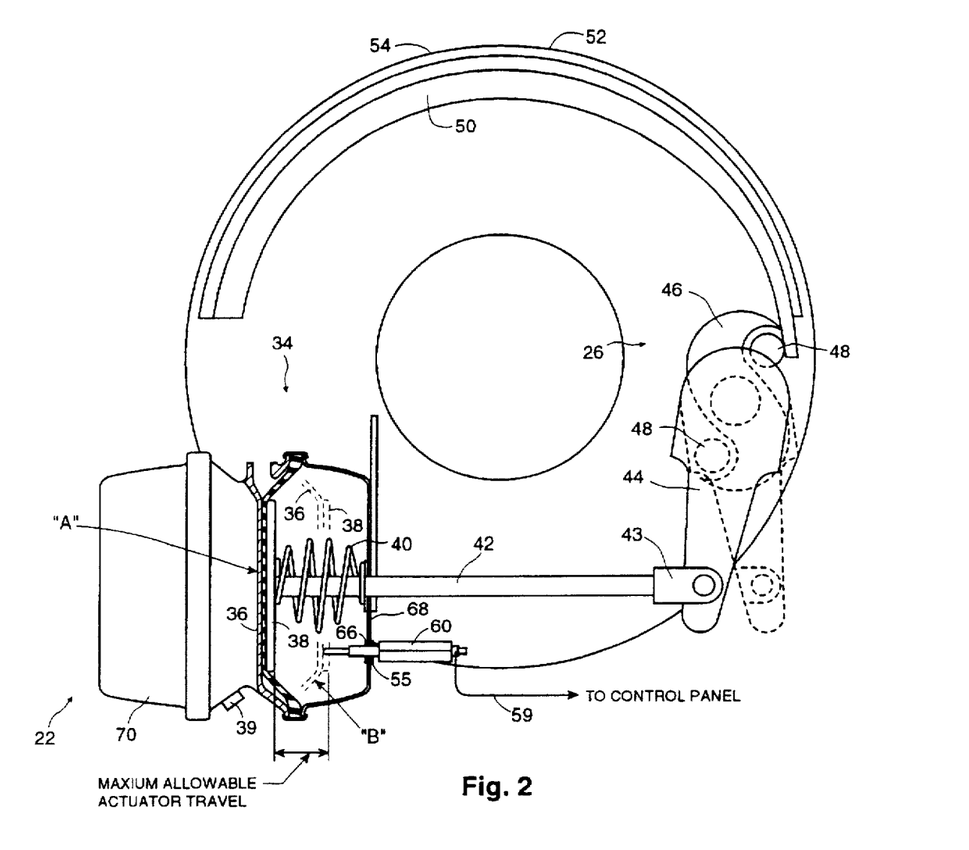
FIG. 2 is an enlarged side elevational view of a portion of the transport truck and the sensor mechanism of the brake monitoring system shown in FIG. 1.

The brake actuation mechanism 34 includes a diaphragm 36 that is moved by compressed air between a retracted position, as shown in solid lining at "A" of FIG. 2 and corresponding to the brake-off position of the brakes 26, and an extended position, as shown at "B" in ghost outline in FIG. 2 and corresponding to the brake-on position of the brakes 26. A pressure plate 38 is secured to the diaphragm 36 and moves therewith. A spring 40 biases the pressure plate 38 and the diaphragm 36 to the retracted position. A rod 42 secured to the pressure plate 38 is pivotally attached to a brake operating crank 44. The crank 44 rotates a cam member 46, which cam member 46 pushes a roller 48 on each brake shoe 50 outwardly so that the brake pads 52 of the brake shoes 50 meet the brake drum 54, thus applying the brakes 26. It can be seen that the brake-on position will vary with brake wear—that is to say, wear of the brake pads 52. Accordingly, as the brake pads 52 wear, the "throw" of the diaphragm 36 and the pressure plate 38 will increase. In most jurisdictions, there is a maximum amount of travel allowed by law of the diaphragm 36 and the pressure plate 38 of the braking system 22, beyond which amount of travel the truck braking system 22 is considered unsafe and is therefore is in contravention of the law.

The braking system 22 is also subject to the malfunction of various parts. For instance, the rollers 48 on the brake shoes 50 may come out of position, or the connector 43 between the rod 42 and the brake operating crank 44 may come undone, and so on.

Figure 6A:
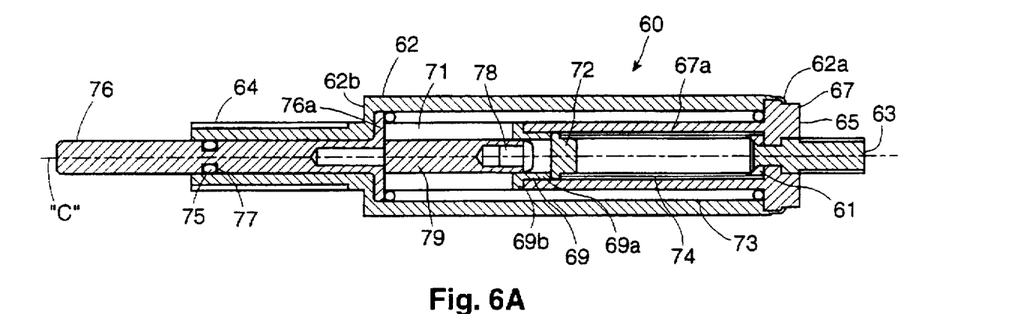
FIG. 6A is an enlarged side sectional view of a first embodiment of the limit switch used in the brake monitoring system of the present invention, with the actuator stem in a rest position and the limit switch in an electrically closed configuration.
Figure 6B:
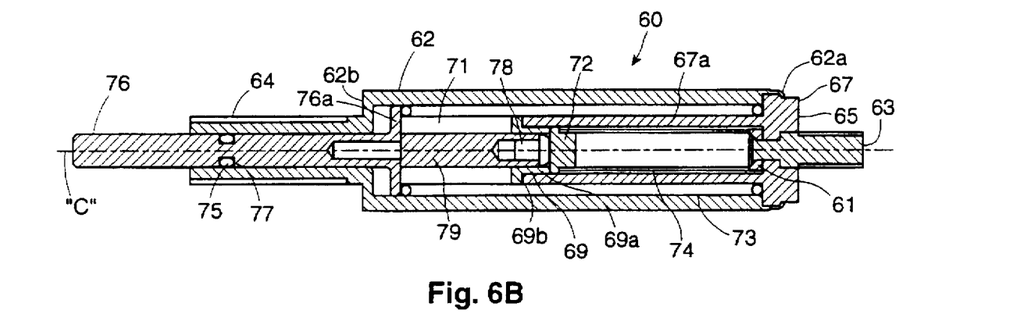
FIG. 6B is an enlarged side sectional view of the limit switch according to FIG. 6A, with the actuator stem in an initial contact position and the limit switch in an electrically closed configuration.
Figure 6C:
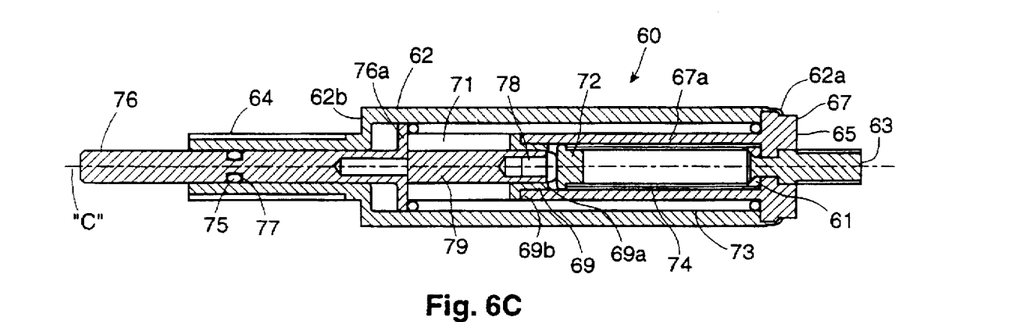
FIG. 6C is an enlarged side sectional view of the limit switch according to FIG. 6A, with the actuator stem in an initial open position and the limit switch in an electrically open configuration.
Figure 6D:
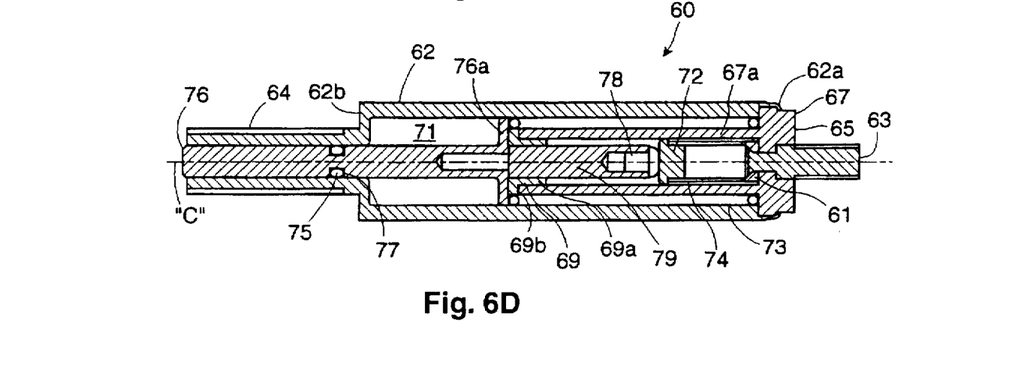
FIG. 6D is an enlarged side sectional view of the limit switch according to FIG. 6A, with the actuator stem in a full-throw position and the limit switch in an electrically open configuration.

As can be best seen in FIG. 2, a signal producing sensor mechanism 60 is mounted one signal producing sensor mechanism 60 on each truck brake 26. Each signal producing sensor mechanism 60 has a main body member 62 and an actuation member in the form of a manually operable actuator stem 76 mounted within the main body member 62 for reversible operation—reversible sliding movement in the preferred embodiment—between a rest configuration, as is shown in FIG. 6A, and a sensing configuration, as is shown in FIG. 6C. In the sensing configuration, a threshold signal is produced, as will be discussed in greater detail subsequently.

Figure 7A:
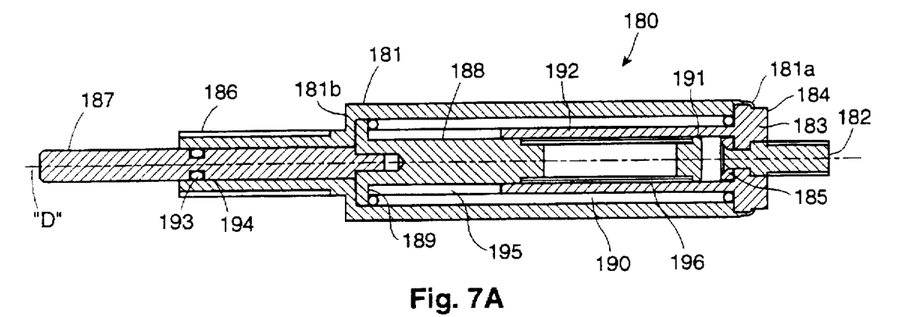
FIG. 7A is an enlarged side sectional view of a second embodiment of the limit switch used in the brake monitoring system of the present invention, with the actuator stem in a rest position and the limit switch in an electrically open configuration.
Figure 7B:
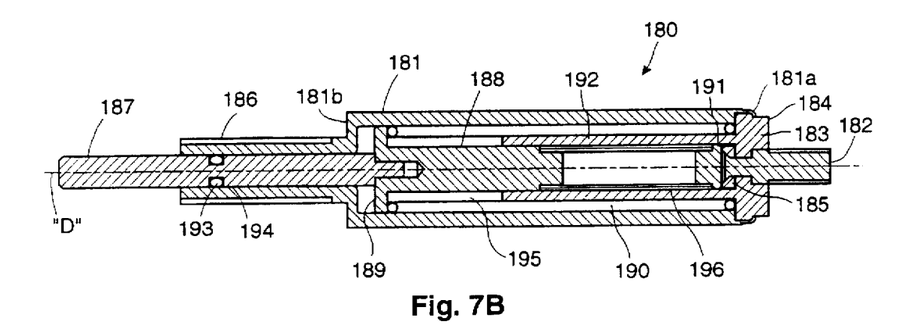
FIG. 7B is an enlarged side sectional view of the limit switch according to FIG. 6A, with the actuator stem in an initial contact position and the limit switch in an electrically closed configuration.

In the preferred embodiment, the signal producing sensor mechanism 60 comprises a single pole single throw limit switch, as illustrated in FIGS. 6A through 6D. In the preferred embodiment, the single pole single throw limit switch 60 is normally closed; however, it is equally acceptable to use a normally open limit switch, as illustrated in FIGS. 7A through 7C, depending on the configuration of the electronic circuitry used in the brake monitoring system of the present invention, which electronic circuitry will be discussed in greater detail subsequently.

Each limit switch 60 that is mounted on a respective brake, is positioned with respect to the respective brake actuating mechanism 34 so as to be actuatable from its rest configuration to its sensing configuration, by the respective brake actuating mechanism 34, when the respective brake is operated from its brake-off position to its brake-on position. The limit switch 60 is mounted into a co-operating aperture 66 in the housing 68 of the air cylinder 70 of the brake actuation mechanism 34, and is secured in place by a pair of co-operating nuts 55. The position of the limit switch 60 is selectively adjustable such that any portion of the threaded extension portion 64 may be disposed at the aperture 66 in the housing 68. In this manner, the limit switch 60 can be set for a specified amount of travel before it is actuated by the pressure plate 38.

Reference will now be made to FIGS. 6A through 6D, in order to discuss the normally closed single pole single throw electrical limit switch 60 in detail. The normally closed single pole single throw electrical limit switch 60 comprises an electrically conductive generally cylindrical main body member 62 having a first end 62a, a second end 62b, and a first longitudinal axis "C" extending between the first and second ends 62a, 62b. A first terminal 63 is mounted in a base portion 65 of an insulating guide member 67, which guide member 67 is securely mounted at the first end 62a of the main body member 62. The first terminal 63 is thereby mounted in electrically isolated relation with respect to the main body member 62. A ferrule 61 secures the first terminal 63 in place.

A contact member 72 is connected in electrically conductive relation to the first terminal 63 by means of a contact biasing spring 74 disposed between an annular flange on the contact member 72 and the ferrule 61. The contact member 72 is also connected in selectively displaceable relation to the first terminal 63 for reversible movement, against the contact biasing spring 74, from an extended position to a retracted position. A conductive bridging member 69 comprising a substantially annular main body portion 69a and an annular flange 69b extending outwardly from the main body portion, is disposed in electrically conductive contact with the contact member 72 when the contact member 72 is in the extended position and disposed in non-contacting electrically insulated relation with the contact member 72 when the contact member 72 is removed from the extended position. A second terminal in the form of the threaded extension portion 64 is connected in electrically conductive relation with respect to the main body member 62. The manually operable actuator stem 76 is mounted in the main body member 62 for slidable movement with respect thereto. The actuator stem 76 comprises an annular flange 76a facing the first end 62a of the main body member 62. An actuator biasing spring 73 is mounted between the annular flange 76a of the actuator stem 76 and the base portion 65 of the guide member 67. An "O"-ring 75 is disposed within an annular race on the manually operable actuator stem 76, which "O"-ring 75 precludes dirt and moisture from entering into the interior 71 of the main body member 62. The manually operable actuator stem 76 is also connected in electrically conductive relation to the second terminal 64.

An electrically conductive plunger member 79 is connected in electrically conductive relation to the manually operable actuator stem 76 and electrically conductive contact with the conductive bridging member 69, and is slidably mounted in the main body member 62 for slidable movement with the manually operable actuator stem 76, along the first longitudinal axis. An insulator 78—typically an insulating plug or disk—is disposed between the electrically conductive plunger member 79 and the contact member 72 for precluding direct electrically conductive contact of the electrically conductive plunger member 79 and the contact member 72 with each other.

The actuator stem 76, the plunger member 79, the conductive bridging member 69, the insulator 78, the contact member 72, the contact biasing spring 74, and the first terminal 63 are substantially collinearly aligned the first longitudinal axis "C". The guide member 67 further has a sleeve portion 67a integral with the base portion 65, which sleeve portion 67a extends inwardly from the base portion 65 into the main body member 62 so as to surround the contact biasing spring 74, the contact member 72, the insulator 78, a portion of the conductive bridging member 69, and a portion of the plunger member 79, thereby acting as a guide therefor.

In operation, the electrically conductive plunger member 79 is movable by manual actuation of the actuator stem 76, against the actuator biasing spring 73, from a rest position, through an initial contact position, through an initial open position, and to a full-throw position. In its rest position, the plunger member 79 is disposed in spaced relation from the contact member 72 and the contact member 72 is in the extended position. The rest position of the plunger member 79 corresponds to the rest configuration of the sensor mechanism. In its initial contact position, the insulator 78 is in contact with the contact member 72 and the plunger member 79, and the contact member 72 is in the extended position, so as to permit the plunger member 79 to move the contact member 72 from the extended position toward the retracted position. The insulator 78 is disposed within the conductive bridging member 69 when the plunger member 79 is in the rest position and when the plunger member 79 is in the initial contact position. In its initial open position, the contact member 72 is slightly removed from the extended position and is removed from electrical contact with the conductive bridging member 69, thus electrically opening the electrical switch. The sensing position of the plunger member 79 corresponds to the sensing configuration of the sensor mechanism. In its full-throw position, the contact member 72 is moved to the retracted position and the plunger member 79 remains removed from electrical contact with the conductive bridging member 69, thus retaining the electrical switch electrically open.

Typically, the full throw position is beyond the sensing position by perhaps 1 cm to 2 cm, or so. The purpose of having a limit position this distance beyond the sensing position is to allow for excessive travel of the diaphragm 36 of the braking system 22 without actually reaching the limit position. It is undesirable for the actuator stem 76 of the limit switch 60 to actually reach its limit position, at least as driven by the diaphragm 36 and pressure plate 38 as described above, as a great deal of force would be imparted to the limit switch 60, thus potentially damaging the limit switch 60. The limit switch 60 is designed such that the threshold signal is produced at the limit position and at all points between the sensing position and the limit position. In other words, once the limit switch 60 has been turned on, in the case of a normally open switch, or if the switch has been turned off, as in the case of a normally closed switch, the limit switch 60 remains in that state once it reaches the sensing position, until the actuator stem 76 is returned past the sensing position towards the rest position.

In use, when the brakes 26 are moved from their brake-off position to their brake-on position, the diaphragm 36 and the pressure plate 38 are moved from a position shown in solid line at "A" in FIG. 2, to a position shown at "B" in ghost outline in FIG. 2. The actuator stem 76 is moved accordingly withe the diaphragm 36 and the pressure plate 38. If the brake actuation mechanism 34 is functioning properly and the brake pads 52 are at or above a threshold brake pad thickness, below which thickness the brake pads 52 are considered unsafe, the actuator stem 76 is moved so as to cause the plunger member 79 to also move; however, the plunger member 79 will not reach its initial open position. Accordingly, the normally closed limit switch 60 will not reach its sensing configuration, and therefore will not produce a threshold signal. In the event that the brake actuation mechanism 34 is not functioning properly or the brake pads 52 are at or below a threshold brake pad thickness, below which thickness the brake pads 52 are considered unsafe, the actuator stem 76 is moved so as to cause the plunger member 79 to also move, until the plunger member 79 reaches its initial open position. Since the initial open position corresponds to the sensing configuration of the normally closed limit switch 60, the limit switch 60 becomes open, and accordingly a threshold signal is produced. The actuation stem 76, and therefore the plunger member 79, may also continue to travel towards the full-throw position of the plunger member 79, and may possibly reach the full-throw position.

Figure 3:
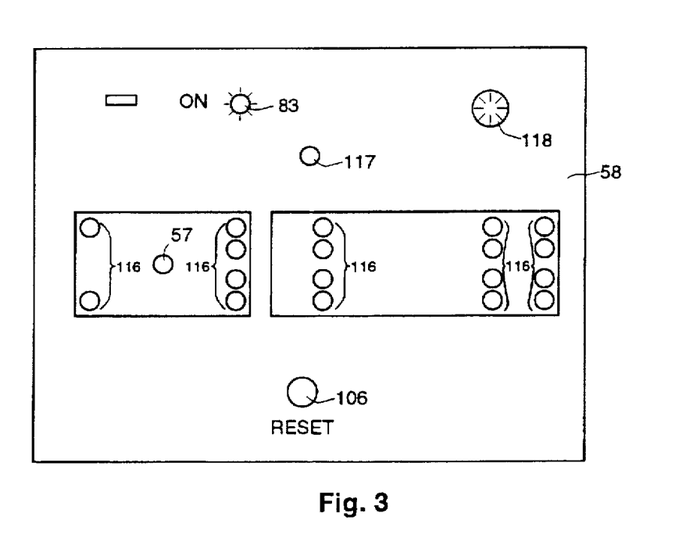
FIG. 3 is a diagrammatic representation of the display panel of the brake monitoring system according to FIG. 1.
Figure 4:
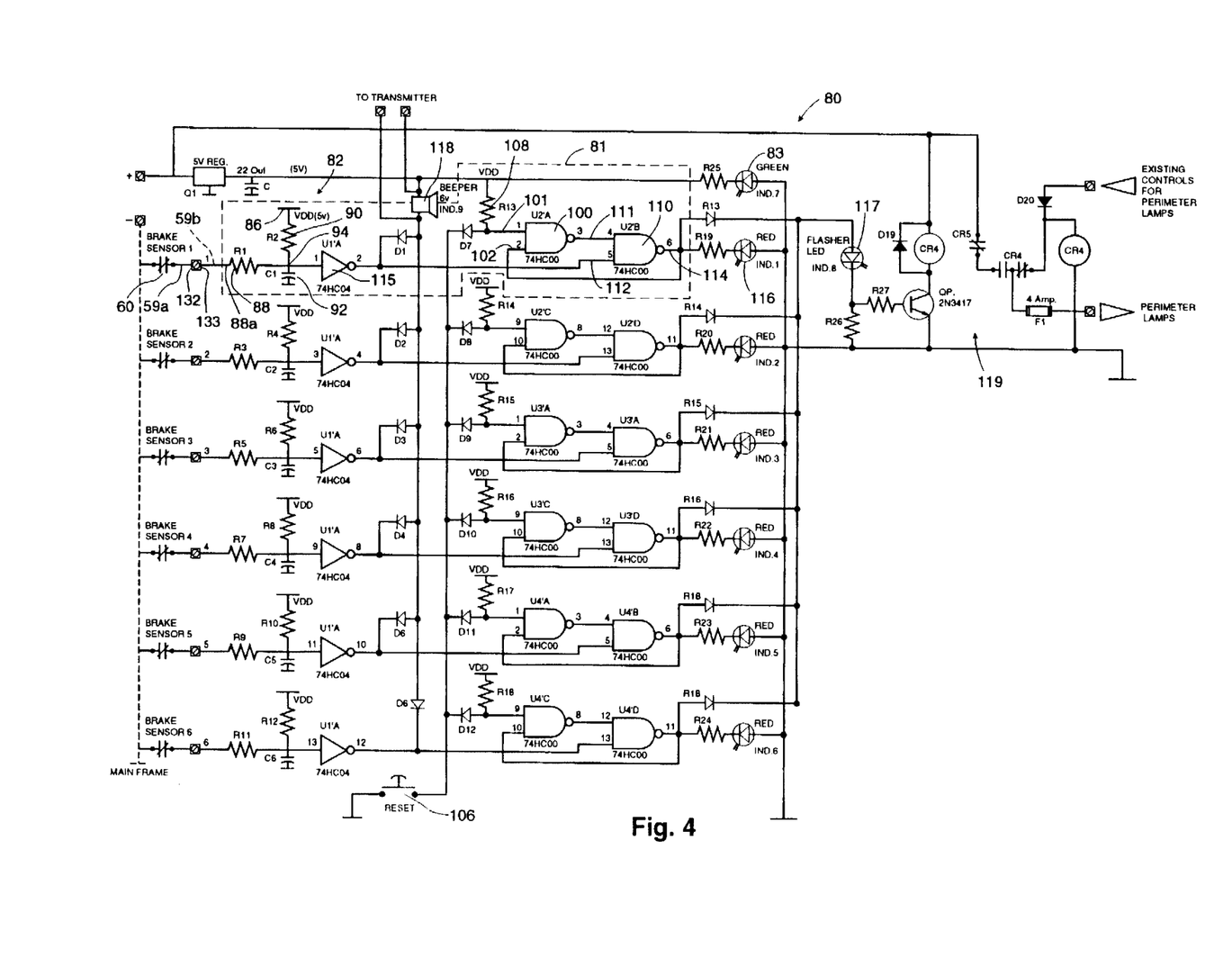
FIG. 4 is a schematic of the main electronic circuitry of the brake monitoring system according to FIG. 1.

Referring now to FIGS. 1, 3, and 4, it can be seen that each one of the limit switches 60 is operatively connected to an indicator means, so as permit receipt by the indicator means of the threshold signal from the respective sensor mechanism. In the preferred embodiment, each indicator means 116 comprises an indicator lamp of one type or another, preferably a light emitting diode 116, mounted on the display panel 58 in the truck's cab 31. As can be best seen in FIG. 3, the various light emitting diodes 116 on the display panel 58 are arranged in the pattern of the wheels 28 of the truck 24 in order to permit such identification of the brake from which the threshold signal is produced. In FIG. 3, the various light emitting diodes that are the indicator means, are indicated generally by reference numeral 116 and a brace bracket, for ease of illustration.

Upon receipt of a threshold signal from any sensor mechanism 60, the appropriate light emitting diode 116 illuminates, thereby providing an alarm indication so as to identify the brake 26 from which the threshold signal was produced.

In the preferred embodiment, there is also common indicator means in the form of a flasher light emitting diode 117, an audible alarm 118, and the marker lights 29 of the transport truck 24, all of which receive the threshold signal from each of the sensor mechanisms and provide an alarm indication upon receipt of such signal. In this manner, the fact that the brake monitoring system of the present invention has detected and is indicating a problem with the truck's braking system is highly visible inside the cab 31 of the tractor 30 so as to ensure that the indication of the problem is seen by the driver, and is visible from outside the truck 24, which is useful for inspection purposes, and the like.

In the preferred embodiment, the indicator means, namely the light emitting diodes 116, the flasher light emitting diode 117, all of which are in the display panel 58, and the marker lights 29, remain on once turned on, both when the brake monitoring system 20 is initially turned on and upon receipt of a threshold signal, so that they will not be missed by the operator of the truck 24, and also so that they cannot be readily ignored. The brake monitoring system 20 therefore further comprises a latching circuit 81 operatively connected between each limit switch 60 and each respective indicator means, namely light emitting diode 116. The audible alarm 118 does not remain on in this manner, but shuts off as soon as any limit switch 60 that has opened, thus triggering the alarm state, becomes closed.

The limit switches 60 are connected to their respective light emitting diodes 116—through an electronic circuit 80, as will be discussed in greater detail subsequently—by means of a wire 59. Each wire 59 is divided into a first portion 59a and a second portion 59b. The first portion 59a is disposed between the light emitting diodes 116 and a connector receptacle 134. The second portion 59b is disposed between an electrical plug 133 and the limit switches 60. Preferably, the respective first 59a and second 59b portions of the wires 59 are connected one to the other by means of connector plugs 133 that are received by connector receptacles 134. The connector plugs 133 are preferably in the form of a ganged connector, and the connector receptacles 134 are also in the form of a ganged connector, and can each accommodate at least forty wires 59, in order to permit connection of virtually any size of trailer 32—in terms of number of wheels 28—or to connect the auxiliary trailer 23. The connector plug 133 plugs into the connector receptacle 134 in order to connect the limit switches 60 to the remainder of the brake monitoring system 20 when the trailer 32 is connected to the tractor 30. Alternatively, a transmitter and receiver system can be used to transmit special signals from the limit switches 60 ultimately to the indicator means such as light emitting diodes 116.

Reference will now be made to FIG. 4 in order to discuss in detail the latching circuit 81 used in the brake monitoring system 20 of the present invention. FIG. 4 shows the overall electronic circuit 80 used in the operation of the brake monitoring system, which overall electronic circuit 80 comprises six latching circuits 81. For the sake of clarity, only one such latching circuit 81 will be discussed, which latching circuit 81 is indicated by an irregularly shaped dashed box drawn therearound. The latching circuit 81 is operatively connected between each of the limit switches 60 and each of the respective indicator means, namely the light emitting diode 116. The latching circuit 81 comprises a voltage divider network 82 connected between ground and a voltage rail 86. The voltage divider network 82 comprises a first resistor 88 and a second resistor 81 connected together in series. The first resistor 88 has a low resistance, about 1K ohms, compared to the second resistor 90, which is about 20K ohms. A DC isolating capacitor 92 is connected at the common point 94 between the resistors and to ground, in order to isolate the common point 94 from ground. Each of the signal producing sensor mechanisms—namely the respective normally closed limit switch 60—is connected between ground and a second end 88a of the first resistor 88, opposite the common point 94. The second end 88a of the first resistor 88 is the input to the latching circuit 81.

A first NAND gate 100 has a first input 101, a second input 102, and an output 104. The first input 101 is connected through a normally open reset switch 106 to ground and through a third resistor 108 to the voltage rail 86. A second NAND gate 110 has a first input 111, a second input 112, and an output 114. The first input 111 is connected to the output 104 of the first NAND gate 100, and the second input 112 is connected through an inverter 115 to the common point 94 of the resistors 88 and 90. The output 114 is connected to the second input 102 of the first NAND gate 100. An indicator means, the light emitting diode 116 is connected to the output 114 of the second NAND gate 110.

In an initial power-on state, a light emitting diode 83 is illuminated to indicate that the power has been turned on, and each of the normally closed limit switches 60 is closed, so as to cause current flow through the voltage divider network 82, which current flow produces a low voltage at the common point 94 compared to the voltage at the voltage rail 86. A corresponding binary zero input is at the inverter 115, and a corresponding binary one input is at the second input 112 of the second NAND gate 110 so as to produce a binary one output from the output 114 of the second NAND gate 110. The reset switch 106 is open in an initial power-on state, so that the first input 101 of the first NAND gate 100 is at the voltage of the voltage rail 86, and is a binary one, and the second input 102 of the first NAND gate 100 is a binary one so as to produce a binary zero output from the output 104 of the first NAND gate 100. Accordingly, the first input 111 of the second NAND gate 110 is a binary zero, thus producing a stable binary one output from the output 114 of the second NAND gate 110.

In order to set the latching circuit 81 from its initial power-on state to a non-alarm state, whereat the latching circuit 81 is quiescent and is ready to receive an alarm indication, it must first be reset. In a reset state, the first input 101 of the first NAND gate 100 is grounded through the reset switch 106 so as to be a binary zero, and so as to produce a binary one output. Accordingly the first input 111 of the second NAND gate 110 is a binary one, thus producing a binary zero output from the output 114 of the second NAND gate 110, which binary zero output corresponds to the brake monitoring system 20 being reset to a null output, and a binary zero at the second input 102 of the first NAND gate 100.

In a non-alarm state, the first input 101 of the first NAND gate 100 is removed from ground so as to be a binary one so as to still produce a binary one output, corresponding to the brake monitoring system 20 having a null output.

When an alarm state occurs, a threshold signal is produced as at least one normally closed limit switch 60 becomes open when the brakes are applied, or alternatively if a wire from one of the limit switches breaks, so as to cease current flow through the voltage divider network 82. The voltage of the voltage rail 86 appears at the common point 94, and a binary one input is made to the inverter 115. The binary one input to the inverter 115 is indicative that the threshold signal is now present. A corresponding binary zero output from the inverter 115 appears at the second input 112 of the second NAND gate 110 so as to produce a binary one output that activates the respective light emitting diode 116. The second input 102 to the first NAND gate 100 is also a binary one so as to produce a binary zero output from the output 104 of the first NAND gate 100. Accordingly, the first input 111 to the second NAND gate 110 becomes a binary zero, thereby producing a stable binary one output from the output 114 of the second NAND gate 110.

After the onset of the alarm state but before a reset state, but in a circumstance when the normally closed limit switch 60 reverts to being closed, there is again current flow through the voltage divider network 82, a corresponding binary zero input at the inverter 115, and a corresponding binary one input into the second input 112 of the second NAND gate 110. The first input 111 of the second NAND gate 110 is at a binary zero, and accordingly the output 114 from the second NAND gate 110 remains at a binary one, thus keeping the respective light emitting diode 116 activated, until the reset switch 106 is closed.

One common indicator means, the audible alarm 118, is connected between the output of the inverter 115 and the voltage rail 86. When the output of the inverter 115 is a binary zero, the audible alarm 118 is activated. Another common indicator means, the flasher LED 117, is connected between the output 114 of the second NAND gate 110 and ground. The third common indicator means, the marker lights 29, are connected to the flasher LED 117, through a relay circuit 119, so as to cause the marker lights 29 to flash in conjunction with the flasher LED 117.

Figure 5:
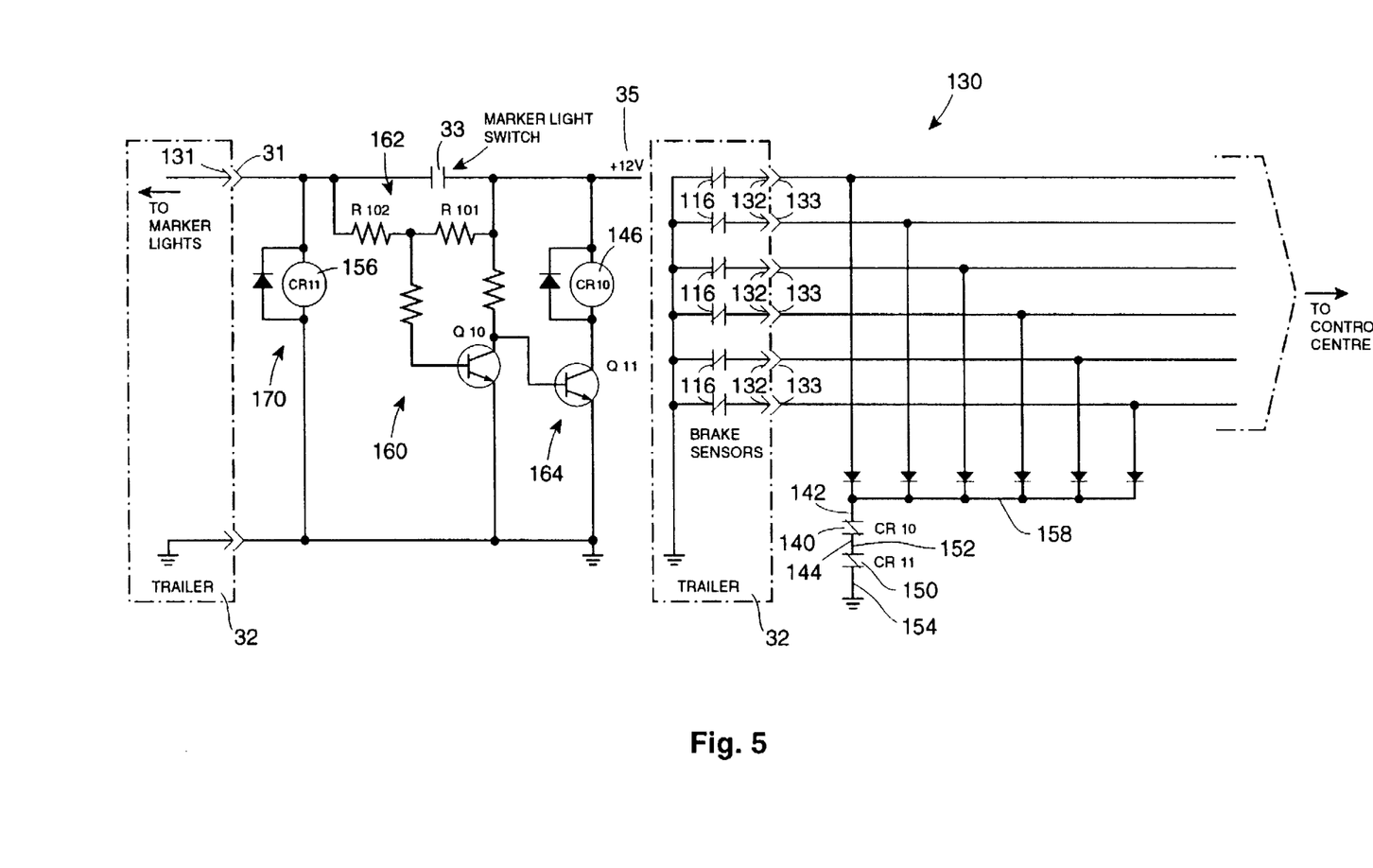
FIG. 5 is a schematic of the interlock electronic circuitry of brake monitoring the system according to FIG. 1.

When the trailer 32 is connected to the tractor 30, it is desirable to connect the limit switches 60 by way of plugging in the connector plug 133 into the connector receptacle 134, which connector receptacle 134 is an input to the remainder of the brake monitoring system 20 of the present invention, in order to take advantage of the operation of the brake monitoring system 20; however, it is possible to forget to connect the limit switches 60. In this event, after the brake monitoring system 20 is turned on, and the reset switch is pressed, the light emitting diodes 116 will remain illuminated as there is an open circuit at the input of the each of the latching circuits 81. As stated earlier, a connector plug 133 and a connector receptacle 134 that can accommodate perhaps 40 or even more wires 59 would typically by used on a transport truck 24. In many circumstances, the tractor 30 and the trailer 32, and also the auxiliary trailer 23, if connected, together have fewer limit switches than the maximum number accepted by the connector plug 133 and the connector receptacle 134. Such circumstances would include the tractor 30 without the trailer 32 connected thereto and frequently when there is only one trailer connected to the tractor 30. For any input 134 that does not have a limit switch 60 connected to it, and is therefore unused, there would be an open circuit at that input 134. Accordingly, the light emitting diode 116 corresponding to that unused input 134 would illuminate on ongoing basis when the brake monitoring system 20 is on, which is unacceptable. In order to overcome this problem, the brake monitoring system 20 of the present invention preferably further comprises an electrical interlock circuit 130, as is depicted in FIG. 5.

The purpose of the electrical interlock circuit 130 is to connect to ground the unused inputs 134 into the electrical circuit 80, such that these unused inputs 134 will not cause an alarm state—in other words, they will not cause the respective light emitting diodes 116 to illuminate. Therefore, when the tractor 30 has no trailer connected to it, the unused light emitting diodes 116 will not illuminate. Further, when only the trailer 32 is connected to the tractor 30, or when the tractor 30, the trailer 32, and the auxiliary trailer together have fewer limit switches 60 than the number of inputs 134 in the electrical circuit 80, the unused light emitting diodes will not illuminate.

In order to determine whether the trailer 32 is connected to the tractor 30, the voltage potential and current flow between the power source and the marker lights 29 is used. When the trailer 32 is not connected to the tractor 30, the marker lights 29 are not connected to the power source outlet and therefore there is no possible path from the power source 35 through the market lights 29, to ground. When the trailer 32 is connected to the tractor 30, the marker lights 29 are also connected. If the power switch 33 is turned off, there is a possible path from the power source 35, through the market lights 29, to ground. If the power switch 33 is turned on, thereby illuminating the marker lights 29, there is actual current flow from the power source 35 through the marker lights 29, to ground. It is therefore possible to use the actual connection of the marker lights 29 on the trailer 32 to control the latching circuits 81 from unwantedly producing an alarm output, by way of an electrical interlock circuit that will now be described with reference to FIG. 5.

The electrical interlock itself circuit comprises a first normally closed relay 140 having an input 142, an output 144, and an actuating coil 146, and comprises a second normally closed relay 150 having an input 152, an output 154, and an actuating coil 156. The first and second normally closed relays 140, 150 are connected in series one with another between a common point 158 for the connector receptacles 134 and ground, so as to ground the inputs to the latching circuit 81, which inputs are at the second ends 88a of the first resistors 88.

A first sensor circuit 160 has a sensing portion 162 operatively connected in parallel with the power switch 33, and a control portion 164 operatively connected to the actuating coil 146 of the first normally closed relay 140. When the marker lights 29 are connected by the connector plug 131 to the power source outlet 41 so as to cause a voltage potential across the power switch 33 and the power switch is turned off, the voltage potential causes the sensing portion 162 of the first sensor circuit 160 to activate the control portion 164 of the first sensor circuit 160. Accordingly, the actuating coil 146 of the first normally closed relay 140 becomes energized, thereby opening the first normally closed relay 140, and thus opening the connection between each connector receptacle 134 and ground.

A second sensor circuit 170 is operatively connected from between the power switch 33 and the power source outlet 41 to ground. When the marker lights 29 are connected by the connector plug 131 to the power source outlet 41 and the power switch 33 is turned on, the actuating coil 156 of the second normally closed relay 150 becomes energized, thereby opening the second normally closed relay 150, and thus opening the connection between each connector receptacle 134 and ground. If the connector plug 133 is not plugged in to the connector receptacle 134, or the portion 59a of the wire 59 is broken, the electrical circuit 80 will indicate an alarm condition through the appropriate light emitting diode 116, thus alerting the operator of the truck 34 that the connector plug 133 is not plugged in to the connector receptacle 134, or that one or more of the portions 59a of the wires 59 is broken.

It can be seen that when there is no trailer 32 connected to the tractor 30 there will be no marker lights 29 connected by way of the connector plug 131 to the co-operating power source outlet 41. In this circumstance, without the electrical interlock circuit 130, the connector receptacle 134 would be seen as open, thus providing an alarm indication; however, with the electrical interlock circuit 130, the inputs at the second ends 88a of the first resistors 88 of the latching circuit 81 are grounded, thus precluding an alarm indication from occurring.

When trailer 32 is connected to the tractor 30, the marker lights 29 are connected by way of the connector plug 131 to the co-operating power source outlet 41. In this circumstance, but before the marker lights 29 are turned on by the power switch 33, with the electrical interlock circuit 130, the first normally closed relay 140 is open and the brake monitoring system 20 of the present invention functions in its usual manner, as described above. In this circumstance, and after the marker lights 29 are turned on by the power switch 33, with the electrical interlock circuit 130, the second normally closed relay 150 is open and the brake monitoring system 20 of the present invention functions in its usual manner, as described above.

Similarly, the electrical interlock circuit 130 functions as discussed above to preclude an alarm indication from occurring when the auxiliary trailer 23 is not connected to the trailer 34, and to permit an alarm indication to occur, as per the usual functioning of the brake monitoring system 20 of the present invention, also as discussed above, when an auxiliary trailer 23 is connected to the trailer 24.

There are various alternative embodiments of the present invention that will now be discussed, some with respect to the drawings, as indicated. These alternative embodiments are all within the spirit and scope of the present invention as defined by the accompanying claims.

FIGS. 7A through 7C show an alternative embodiment limit switch, a normally open single pole single throw electrical limit switch 180. The normally open single pole single throw electrical limit switch 180 comprises an electrically conductive generally cylindrical main body member 181 having a first end 181a, a second end 181b and a first longitudinal axis extending between the first and second ends 181a, 181b.

A first terminal 182 is mounted in the base portion 183 of an insulating guide member 184, which guide member 184 is securely mounted at the first end 181a of the main body member 181. The first terminal 182 is thereby mounted in electrically isolated relation with respect to the main body member 181. A ferrule 185 secures the first terminal 182 in place. A second terminal 186 is connected in electrically conductive relation with respect to the main body member 181. A manually operable actuator stem 187 is mounted in the main body member 181 for slidable movement with respect thereto and is connected in electrically conductive relation to the second terminal 186. An "O"-ring 193 is disposed within an annular race 194 on the manually operable actuator stem 187, which "O"-ring 193 precludes dirt and moisture from entering into the interior 195 of the main body member 181.

An electrically conductive plunger member 188 is connected in electrically conductive relation to the manually operable actuator stem 187, and further is slidably mounted in the main body member 181 for slidable movement with the manually operable actuator stem 187. The plunger member 188 comprises an annular flange 189 and the actuator biasing spring 190 is mounted between the annular flange 189 of the plunger member 188 and the base portion 183 of the guide member 184.

A contact member 191 is connected in electrically conductive relation to the electrically conductive plunger member 188 by means of the contact biasing spring and is connected in selectively displaceable relation to the electrically conductive plunger member 188 for reversible movement, against a contact biasing spring, from an extended position to a retracted position.

The actuator stem 187, the plunger member 188, the contact biasing spring, the contact member 191, and the first terminal 182 are substantially collinearly aligned the first longitudinal axis "D".

The guide member 184 further has a sleeve portion 192 integral with the base portion 183, which sleeve portion 192 extends inwardly from the base portion 183 into the main body member 181 so as to surround the contact member 191, the contact biasing spring, and a portion of the plunger member 188, thereby acting as a guide therefor.

In operation, the electrically conductive plunger member 188 is movable along the first longitudinal axis by manual actuation of the actuator stem 187, against the actuator biasing spring 190, from a rest position, through an initial contact position, and to a full-throw position. In its rest position, the contact member 191 is disposed in spaced relation from the first terminal 182 and the contact member 191 is in the extended position. In its initial contact position, the contact member 191 is in electrically conductive contact with the first terminal 182 and the contact member 191 is in the extended position, thus electrically closing the electrical switch. In its full-throw position, the contact member 191 is moved to the retracted position and the contact member 191 remains in electrically conductive contact with the first terminal 182, thus retaining the electrical switch electrically closed.

Figure 8:
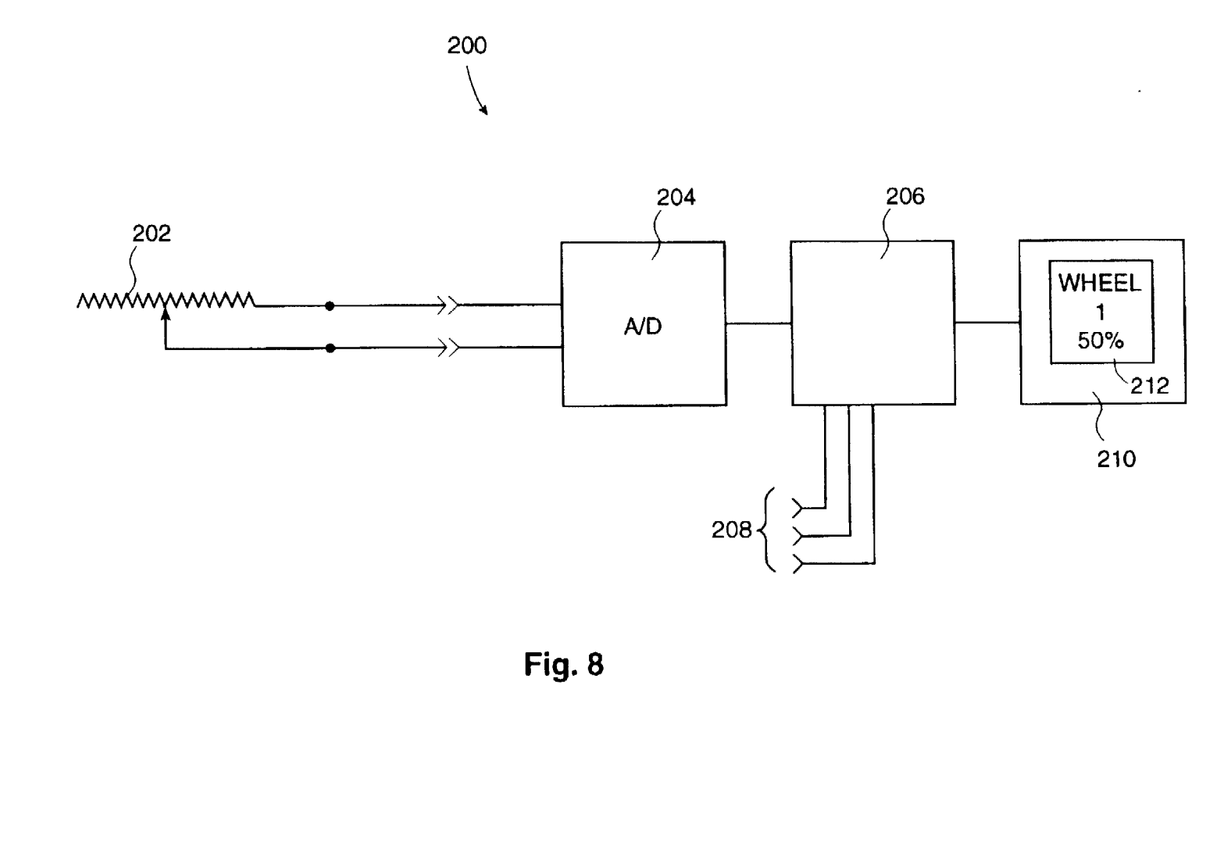
FIG. 8 is a simplified block diagram of an alternative embodiment of the brake monitoring system of the present invention.

In an alternative embodiment of the present invention, as is depicted in FIG. 8, it is contemplated that the signal producing sensor mechanism, as indicated by the general reference numeral 200, comprises a rheostat 202 and an analog-to-digital converter 204 operatively connected to the rheostat 202. A spring biased actuation arm (not shown) is connected to the rheostat, which actuation arm is moved by the diaphragm and pressure plate of the brake actuation mechanism discussed previously herein. A control circuit 206 is connected to the analog-to-digital converter 204 and receives output therefrom. Other analog-to-digital converters may also be connected to the control circuit 206 as evidenced by the terminated inputs 208. A display module 210 having an alphanumeric digital display 212 is connected to the control circuit 206. The rheostat 202 produces an analog signal corresponding to the travel of the brake actuating mechanism 34 and the analog-to-digital converter 204 produces the threshold signal as derived from the analog signal. The threshold signal is transmitted to the control circuit 206 and is ultimately received by the indicator means, namely the display module 210 for display by the alphanumeric digital display 212.

In another alternative embodiment of the present invention, it is contemplated that a second signal producing sensor mechanism could be used on each brake 26, which second signal producing sensor mechanism is set to a shorter "throw" than is the signal producing sensor mechanism discussed in the preferred embodiment, in order to provide a warning that the threshold brake pad thickness will soon be reached.

It is further contemplated that the brake monitoring system 20 of the present invention could include a digital data recorder, or the like, which digital data record would be operatively connected to the outputs of the latching circuits 81 and would record information such as the time and date of an alarm output generated from the latching circuits 81. An external computer could be selectively connected to the digital data recorder in order to transfer the results stored in the digital data recorder to the computer. The external computer could be operated by the operator of the truck, or could be operated by a Goverment official, or the like, such as at a truck inspection station.

Other modifications and alterations may be used in the design and manufacture of the apparatus of the present invention without departing from the spirit and scope of the accompanying claims.

What is claimed is:

1. A brake monitoring system for use on a braking system of a truck, wherein said braking system includes a plurality of separate brakes, and wherein each brake includes a brake actuating mechanism for urging the brakes from a brake-off position to a brake-on position in order to apply the brakes of said truck and wherein the brake-on position will vary with brake wear, and wherein the brake-on position is subject to malfunction of the braking system; wherein said brake monitoring system comprises:

a signal producing sensor mechanism for each brake, each sensor mechanism comprising a single pole single throw limit switch having a main body member and an actuation member mounted within said main body member for reversible movement of said actuation member with respect to said main body member between a rest position a sensing position whereat a threshold signal is produced, and a limit position beyond said sensing position, wherein said threshold signal is produced at said sensing position and continuously between said sensing position and said limit position;

wherein each sensor mechanism is securely mounted on a respective brake, and said actuation member of each sensor mechanism is positioned with respect to the respective brake actuating mechanism so as to be actuatable from said rest configuration to said sensing configuration by the respective brake actuating mechanism, when the respective brake is operated from said brake-off position to said brake-on position sensing configuration, such that when said brake actuating mechanism reaches a threshold limit of travel corresponding to one of a (1) malfunction of said braking system and (2) a threshold brake pad thickness below which thickness said brake pad is considered unsafe, said sensing configuration of said signal producing sensor mechanism is realized, and said threshold signal is produced; and respective indicator means disposed in the truck's cab and operatively connected to said each of said sensor mechanisms so as to permit receipt by said indicator means of said threshold signal from each of said sensor mechanisms;

wherein, upon receipt of a threshold signal from any said sensor mechanism, said indicator means provides an alarm indication, so as to identify the brake from which said threshold signal was produced.

2. The brake monitoring system of claim 1, wherein said single pole single throw limit switch is normally closed.

3. The brake monitoring system of claim 2, further comprising an electronic latching circuit operatively connected between each limit switch and each respective indicator means.

4. The brake monitoring system of claim wherein said latching circuit comprises:

a voltage divider network connected between ground and a voltage rail, comprising a first resistor and a second resistor connected together in series, where said first resistor has a low resistance compared to said second resistor, and a DC isolating capacitor at the common point between the resistors to isolate the common point from ground;

wherein each said signal producing sensor mechanism comprises a normally closed switch connected between ground and a second end of said first resistor opposite said common point;

a first NAND gate having a first input connected through a normally open reset switch to ground and through a third resistor to said voltage rail, a second input, and an output;

a second NAND gate having a first input connected to said output of said first NAND gate, a second input connected through an inverter to said common point of said resistors, and an output connected to said second input of said first NAND gate;

an indicator means connected to said output of said second NAND gate;

wherein, in an initial power-on state, each said signal producing sensor mechanism is closed so as to cause current flow through said voltage divider network, which current flow produces a low voltage at said common point compared to the voltage at said voltage rail, and a corresponding binary zero input at said inverter, and a corresponding binary one input at said second input of said second NAND gate so as to produce a binary one output from said second NAND gate; wherein said reset switch is open in an initial power-on state, so that said first input of said first NAND gate is at the voltage of said voltage rail, and is a binary one, and the second input of said first NAND gate is a binary one so as to produce a binary zero output from said first NAND gate; and accordingly, said first input of said second NAND gate is a binary zero, thus producing a stable binary one output from said second NAND gate;

wherein, in a reset state, said first input of said first NAND gate is grounded through said reset switch so as to be a binary zero, and so as to produce a binary one output; and accordingly said first input of said second NAND gate is a binary one, thus producing a binary zero output from said second NAND gate, corresponding to said brake monitoring system being reset to a null output, and a binary zero at the second input of said first NAND gate;

wherein, in a non-alarm state, said first input of said first NAND gate is removed from ground so as to be a binary one so as to still produce a binary one output, corresponding to said brake monitoring system having a null output;

wherein, when an alarm state occurs, said threshold signal is produced as at least one signal producing sensor mechanism becomes open so as to cease current flow through said voltage divider network, whereby the voltage of said voltage rail appears at said common point and a binary one input, which is made to said inverter; wherein said binary one input to said inverter is indicative that said threshold signal is now present; wherein a corresponding binary zero output from said inverter appears at said second input of said second NAND gate so as to produce a binary one output that activates the respective indicator means; wherein said second input to said first NAND gate is also a binary one so as to produce a binary zero output therefrom; and accordingly said first input to said second NAND gate becomes a binary zero, thereby producing a stable binary one output therefrom; and wherein, after the onset of said alarm state but before a reset state, but in a circumstance when said signal producing sensor mechanism reverts to being closed, there is again current flow through said voltage divider network, a corresponding binary zero input at said inverter, and a corresponding binary one input into said second input of said second NAND gate, but said first input of said second NAND gate is at a binary zero, and accordingly said output from said second NAND gate remains at a binary one, thus keeping the respective indicator means activated, until said reset switch is closed.

5. The brake monitoring system of claim 4, further comprising an audible alarm connected between the output of said inverter and said voltage rail, such that when the output of said inverter is a binary zero, said audible alarm is activated.

6. The brake monitoring system of claim 4, further comprising an electrical interlock circuit for use in conjunction with an auxiliary trailer having a plurality of signal producing sensor members installed one on each wheel of said auxiliary trailer, and wherein said auxiliary trailer has a lighting system comprising a plurality of marker lights removably connectable by means of a first electrical connector to a co-operating power source outlet on said truck, wherein said power source outlet is controlled by a power switch disposed between said power source outlet and a power source on said truck; wherein each said signal producing sensor mechanism on said auxiliary trailer is removably operatively connectable to said respective indicator means by means of a connector plug to a connector receptacle, which connector receptacle is operatively connected to said respective indicator means; said electrical interlock circuit comprising:

first and second normally closed relays each having an input, an output, and an actuating coil, with said first and second normally closed relays connected in series one with another between a common point for said connector receptacles and ground, so as to ground said respective indicator means;

a first sensor circuit having a sensing portion operatively connected in parallel with said power switch, and a control portion operatively connected to said actuating coil of said first normally closed relay, such that when said marker lights are connected by said first electrical connector to said power source outlet so as to cause a voltage potential across said power switch, said voltage potential causes said sensing portion of said first sensor circuit to activate said control portion of said first sensor circuit, and accordingly said actuating coil of said first normally closed relay becomes energized, thereby opening said first normally closed relay, and thus opening the connection between each said connector receptacle and ground; and a second sensor circuit operatively connected from between said power switch and said power source outlet to ground, such that when said marker lights are connected by said first electrical connector to said power source outlet and said power switch is turned on, said actuating coil of said second normally closed relay becomes energized, thereby opening said second normally closed relay, and thus opening the connection between each said connector receptacle and ground.

7. The brake monitoring system of claim 1, further comprising a common indicator means that receives said threshold signal from each of said sensor mechanisms and which provides an alarm indication upon such receipt.

8. The brake monitoring system of claim 7, wherein each said common indicator means comprises a plurality of truck and trailer marker lights.

9. The brake monitoring system of claim 1, wherein said braking system includes a plurality of drum brakes, and wherein each drum brake includes an air operated actuator that moves a diaphragm to ultimately apply the brakes, and wherein each said limit switch is securely mounted on a housing portion of a respective one of said drum brakes, and said actuation member of each sensor mechanism is positioned with respect to said diaphragm so as to be movable by said diaphragm when the respective drum brake is actuated, from said rest position toward said limit position, such that when said diaphragm reaches a threshold limit of travel corresponding to a threshold brake pad thickness, said sensing position of said limit switch is reached and said threshold signal is produced.

10. The brake monitoring system of claim 1, wherein said single pole single throw limit switch is normally open.

11. The brake monitoring system of claim 1, wherein said braking system is actuated by means of a compressed air source providing an elevated air pressure level in said braking system upon actuation of a brake pedal, and wherein said brake monitor system further comprises a pressure sensor mechanism operatively mounted on said braking system so as to sense the air pressure level within said braking system and so as to be actuatable by the air pressure level in said braking system when said air pressure level reaches a threshold limit so as to produce a threshold pressure signal, and an indicator means disposed in the truck's cab and operatively connected to said pressure sensor mechanism so as to permit receipt by said indicator means of said pressure signal from said pressure sensing mechanism.

12. The brake monitoring system of claim 1, wherein said pressure sensing mechanism comprises a pressure sensor switch.

13. The brake monitoring system of claim 1, wherein each said indicator means comprises an indicator lamp.

14. The brake monitoring system of claim 1, wherein said signal producing sensor mechanism comprises a rheostat and an analog-to-digital converter operatively connected to said rheostat, wherein said rheostat produces an analog signal corresponding to the travel of said brake actuating mechanism and said analog-to-digital converter produces said threshold signal as derived from said analog signal, which threshold signal is received by said indicator means.

* * * * *